July 28, 1931. C. HELLE 1,816,115
SOLDERING APPARATUS
Filed Dec. 1, 1930
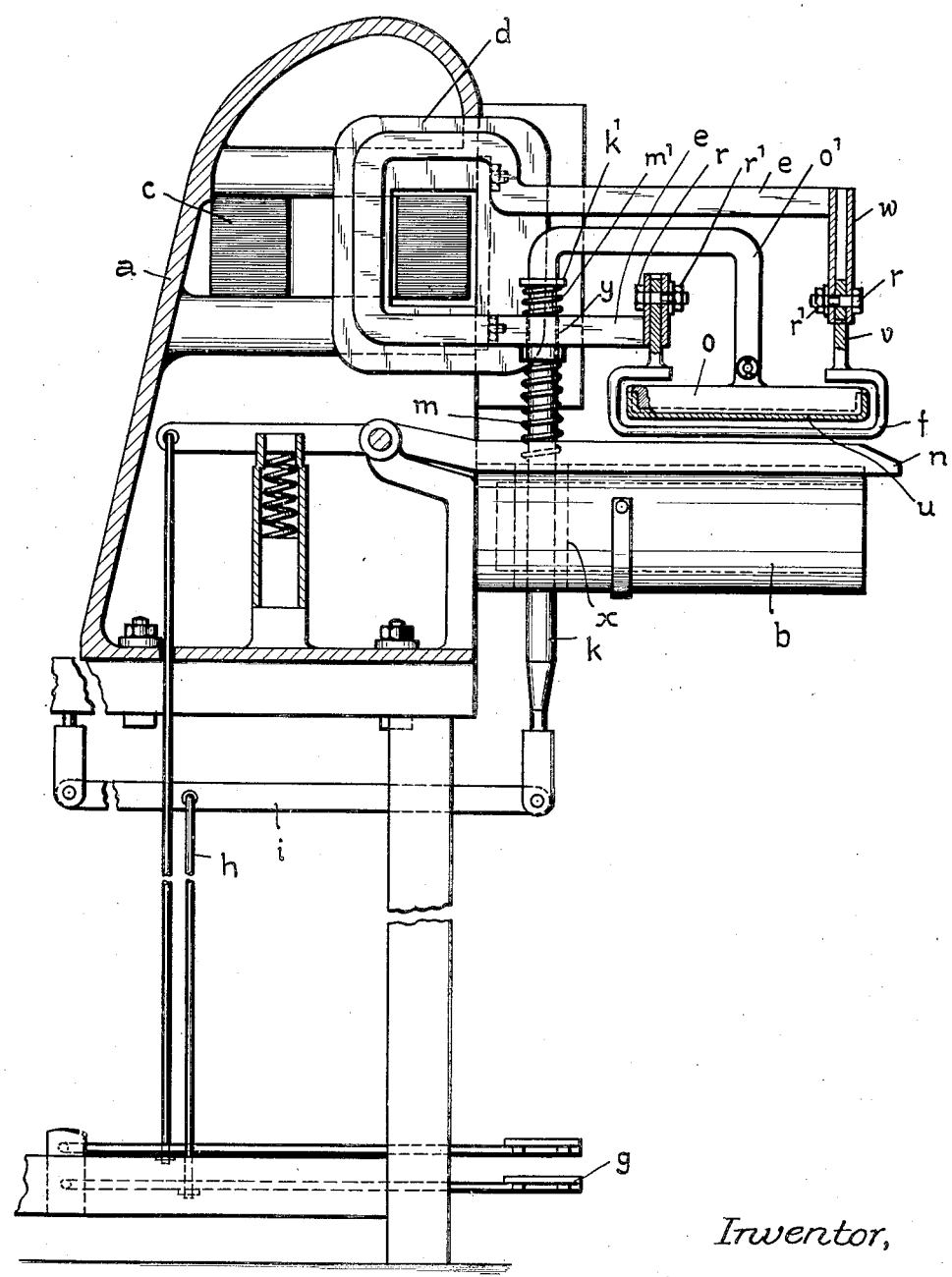
Inventor,
Carl Helle,
by A.W.Dahm,
Attorney.

Patented July 28, 1931

1,816,115

UNITED STATES PATENT OFFICE

CARL HELLE, OF BRUNSWICK, GERMANY, ASSIGNOR TO ELEKTRISCHE LOT- UND SCHWEISZ-GESELLSCHAFT MIT BESCHRANKTER HAFTUNG, OF BRUNSWICK, GERMANY

SOLDERING APPARATUS

Application filed December 1, 1930, Serial No. 499,369, and in Germany November 4, 1930.

My invention relates to improvements in soldering apparatus, and more particularly in soldering apparatus in which a transformer is used for electrically heating the soldering iron, and in which the soldering iron is rigidly connected with the secondary of the transformer, the said secondary being adapted to be shifted relatively to the core of the transformer for bringing the soldering iron into and out of soldering position. An apparatus of this type has been described in my copending application for patent Ser. No. 397045, filed October 3, 1929, and in the construction shown in the said application the apparatus is designed for soldering the longitudinal seams of sheet metal cans and the like.

I have found that in the practical operation of the apparatus described in the said application it may happen, after extended use, that the soldering iron is deformed more or less by heat, so that it is not in direct contact all over its length with the blank and the seam of the blank is not uniformly heated. The object of the improvements is to provide an apparatus in which this objection is obviated, and with this object in view my invention consists in equipping the apparatus with a yielding or flexible soldering iron, and providing a member adapted to engage the soldering iron and to press the same on the seam of the blank.

For the purpose of explaining the invention an example embodying the same has been illustrated in the accompanying drawing showing a sectional elevation of the apparatus.

The apparatus shown in the drawing is similar in construction to the apparatus shown in my aforesaid application for patent, and it comprises a frame $a$ of any known or preferred construction, the said frame having a mandrel $b$ projecting from the front side thereof for supporting the blanks thereon. Above the said mandrel a transformer is mounted on the frame $a$, the said transformer comprising a core $c$ carrying two primary coils $d$ on one of its shanks. Between the said coils $d$ the secondary is located, which consists of a broad copper band $e$ bent into annular shape and connected at its ends by a soldering iron $f$. As shown in the figure the soldering iron $f$ is bent into the shape of an open rectangular ring the long side of which is located above the mandrel $b$, and which is made integral at its ends with upwardly directed arms $v$ passed into tubular end portions $w$ of the copper band $e$ and fixed thereto by means of screws $r$ and nuts $r^1$. The portion of the secondary surrounding the shank of the core has so much clearance on the said core that it can be moved upwardly and downwardly and with the soldering iron $f$ into and out of soldering position for soldering the seam of a can placed on the mandrel $b$, without interrupting the action of the transformer. For thus moving the secondary $e$ upwardly and downwardly a foot lever $g$ is provided which is connected by a link $h$ and a lever $i$ with a rod $k$ passed through a bore $x$ of the mandrel $b$ and through a bore $y$ of the secondary $e$. On the rod $k$ springs $m$ and $m'$ are located, the spring $m$ tending to move the secondary and the operating mechanism thereof upwardly and out of soldering position, and the spring $m'$ being located between the band $e$ and a collar $k'$ of the rod $k$. By pressing the lever $g$ downwardly the secondary $e$ is moved with the soldering iron $f$ into contact with the seam of the blank.

For holding the blank in position on the mandrel $b$ a lever $n$ is provided which is adapted to be operated by a foot lever.

At its top end the rod $k$ is provided with an angular extension $o^1$ the downwardly directed arm of which carries a pressing member or rail $o$ located within the ring-shaped portion of the soldering iron $f$ and slightly spaced from the elongated horizontal part thereof. The said pressing member is provided with a lining $u$ of insulating material preventing the transmission of heat and electric current from the soldering iron to the member $o$. The soldering iron $f$ is comparatively thin so that it is adapted to be pressed by the member $o$ into close contact with the blank to be soldered. Therefore, the deformation of the said soldering iron by the heat of the electric current does not prevent true contact between the same and the blank. Further, by providing a comparatively thin soldering iron the electric energy needed for heating the same to soldering temperature is comparatively small.

In the operation of the apparatus a can is placed on the mandrel $b$ with its seam directed upwardly, and it is held in position thereon by means of the lever $n$. After the soldering iron $f$ has been heated to soldering temperature the attendant presses the foot lever $g$ downwardly. Thereby at first the soldering iron $f$ and the member $o$ are pressed downwardly against the tension of the spring $m$, and after the soldering iron has made contact with the seam of the blank the member $o$ is further pressed downwardly against the tension of the spring $m'$ and into engagement with the elongated part of the soldering iron thus pressing the same into true contact with the seam of the blank even if it has before been deformed by heat.

I claim:

1. The herein described soldering apparatus, comprising a mandrel adapted to support a blank to be soldered, a yielding soldering iron cooperating with said mandrel, heating means for said soldering iron, means for moving said soldering iron and mandrel towards each other and into soldering position, a solid pressing member adapted bodily to engage said soldering iron for pressing the same into true soldering position, and means for operating said pressing member.

2. A soldering apparatus, comprising blank supporting means, a transformer having a secondary, a soldering iron having a soldering portion and connected with said secondary, means for moving said soldering iron into soldering engagement with a blank placed on said supporting means, a pressing member adapted to engage the soldering portion of said soldering iron and to press the same into true contact with said blank, and means for operating said pressing member.

3. A soldering apparatus, comprising blank supporting means, a transformer having a secondary in the form of an annular band, a yielding soldering iron connected with said band, the secondary having sufficient play on the core of the transformer for moving the same with the soldering iron into and out of soldering position, and a pressing member adapted to engage said soldering iron and to press the same into true contact with the blank placed on said supporting means, and operating mechanism for said soldering iron and pressing member comprising a member yieldingly connected with said soldering iron and rigidly connected with said pressing member.

In testimony whereof I hereunto affix my signature.

CARL HELLE.